United States Patent [19]
Dean et al.

[11] Patent Number: 5,881,369
[45] Date of Patent: Mar. 9, 1999

[54] DUAL MODE TRANSCEIVER

[75] Inventors: Stuart James Dean, Nepean; David William Park, Kanata, both of Canada

[73] Assignee: Northern Telecom Limited, Quebec, Canada

[21] Appl. No.: 675,756

[22] Filed: Jul. 3, 1996

[51] Int. Cl.$^6$ .................................................. H04B 1/44
[52] U.S. Cl. ................................ 455/78; 455/86; 455/266
[58] Field of Search ............................ 455/54.1, 74, 76,
455/78, 80, 83, 84, 86, 102, 103, 266, 313,
315, 552, 553, 575, 340, 77, 188.1, 180.1,
73; 370/276, 280, 281, 294, 295

[56] References Cited

U.S. PATENT DOCUMENTS

| | | | |
|---|---|---|---|
| 5,465,409 | 11/1995 | Borras et al. | 455/260 |
| 5,475,677 | 12/1995 | Arnold et al. | |
| 5,483,209 | 1/1996 | Takayama | 333/174 |
| 5,550,895 | 8/1996 | Burson et al. | 379/59 |

*Primary Examiner*—Andrew I. Faile
*Assistant Examiner*—Christopher Onuaku
*Attorney, Agent, or Firm*—Jeffrey M. Measures

[57] ABSTRACT

A dual mode transceiver architecture suitable for adaptation in either a handset or a base station and capable of operating in both Frequency Division Duplex (FDD) mode or in Time Division Duplexing (TDD) mode is disclosed. Such a transceiver has an up conversion path capable of up converting an Intermediate Frequency (IF) to a Radio Frequency (RF) signal in either an upper band frequency range or a lower band frequency range. Also the transceiver has a down conversion path, used for receiving, for down converting a RF signal in either the upper band or lower band to a desirable IF frequency. The transceiver includes a switch array capable of switching the up conversion path to either the upper band port or the lower band port of a diplexer and the switch array also switches the upper band port and lower band port of the diplexer to the down conversion path depending on whether the transceiver is operating in TDD mode or FDD mode. Also, if in TDD mode, the switch array determines whether the transceiver is transmitting or receiving.

22 Claims, 2 Drawing Sheets

DUAL MODE TRANSCEIVER

FIELD OF THE INVENTION

The present invention relates to wireless telephone networks in which full duplex communication is achieved by Frequency Division Duplexing (FDD) or Time Division Duplexing (TDD).

BACKGROUND OF THE INVENTION

Time Division Duplexing (TDD) and Frequency Division Duplexing (FDD) are two commonly used techniques for allowing two way communication.

The TDD system uses a single RF channel for allowing communication and hence can be considered similar to a simplex channel in that transmission takes place in one direction at a time, and then switches direction (e.g. from transmission to reception). However in TDD systems the switching from transmission. (Tx) to reception (Rx) is extremely fast and is transparent to the user, giving the impression of a duplex link.

The FDD system on the other hand uses two RF channels, usually well seperated in frequency, one for each direction of transmission and thus provides for dual simplex operation.

Both systems effectively enable duplex, two way voice communications. There are, however, differences in the implementation of such systems that give advantages and disadvantages to each system depending on the deployment of the system.

For TDD a period has to be allowed between transmission and reception to allow for the time it takes for the radio wave to travel between the two sites. This reduces the amount of information that can be transmitted over the link and thus limits the maximum range of the system. It also means that for cellular radio, multiple base stations within communications range of a mobile have to be synchronized in time.

For an FDD system, different frequencies are used for uplink and downlink transmitters, so the system can operate in a less synchronised manner.

To maximize the performance of a system a technique known as diversity reception is often used. In a cellular radio system it is often not practical to provide diversity at the handset. However, a base station can use uplink (mobile to base station) diversity for reception. In a TDD system, unlike an FDD system, downlink (Base to Mobile) diversity can be provided by using the uplink diversity selection technique in reverse. This is because with TDD, providing there is a sufficiently short timescale between transmit and receive periods, the path between the base and mobile will be relatively unchanged. (This allowable time period is primarily determined by the relative velocities of the two terminals and any multipath reflection points affecting the link).

For FDD systems the uplink and downlink are at differing frequencies and thus, the uplink diversity technique cannot be used in reverse as the uplink and downlink are affected differently by multipath reflection. Thus only uplink diversity is available to FDD systems.

For these reasons, TDD systems are generally optimum for environments where short range communications is required with particularly difficult propagation paths i.e. indoor systems or urban micro-cellular systems. Whereas FDD systems are more appropriate for long range outdoor systems i.e. Macrocellular systems where maximum cell ranges are required.

At present the needs of cellular radio are in general met by using long range FDD systems outdoor in the licenced band and using short range low power TDD system in the unlicenced band. These two networks normally require separate handsets and base stations.

There is, therefor, a need to provide for a single wireless network that can be optimized for both long range (Macrocells) together with indoor coverage and urban microcells.

There are also issues of compatibility between networks using the two duplexing methods unless care is taken in the network design. For example, usually there are two frequency bands allocated to PCS systems, called an upper band and a lower band. There are also multiple operators in each area which share these bands. For example, assuming two operators a typical allocation would give the first operator the first half of the lower band and also the first half of the upper band, while the second operator in the area gets the upper half of the lower band and the upper half of the upper band. While there is typically a relatively large separation between the upper band and the lower band there is potential for interference between the two operators within each band. If both operators use FDD this does not generally present a problem as each operator only uses their channels in the upper band for transmission from the base station whereas each operator uses their channels in the lower range for reception. However, if one operator uses FDD and another operator uses TDD then mutual interference is possible for transmission by closely located base stations. The increasing pressure on operators to share sites (to reduce Cost, Environmental Impact, Site Availability, Zoning requirements etc.) gives an advantage to a system that can adapt its duplexing means to suit the local radio environment. This can offer more flexibility for site sharing arrangements without the need for specific site engineering whilst retaining the advantages of both systems.

There is therefore a need to provide a system which is flexible enough to use either TDD or FDD depending on which is more favourable for the particular application.

SUMMARY OF THE INVENTION

It is therefore an object of the present invention to provide a dual mode transceiver architecture which supports both FDD and TDD modes of operation. Advantageously, such a dual mode system allows the method that best fits the environment to be used gaining the advantages of both techniques as circumstances permit.

A broad aspect of the invention provides for a dual mode transceiver comprising an up conversion path for converting an intermediate frequency (IF) signal to a radio frequency (RF) signal in either an upper frequency range or a lower frequency range; a down conversion path for converting a received RF signal in either an upper frequency range or a lower frequency range to an IF signal; a diplexer, having an upper range filter and a lower range filter, for connecting to an antenna; a switch array for connecting said up conversion path to either said upper range filter or said lower range filter and for connecting said down conversion path to either said upper range filter or said lower range filter; a switch controller for selecting which connections are made by said switch array depending on whether said transceiver is operating in FDD or TDD mode and on whether said transceiver is transmitting or receiving; and a mode selection switch, for selecting whether said transceiver is operating in FDD or TDD mode.

BRIEF DESCRIPTION OF THE DRAWINGS

The present invention, together with further objects and advantages thereof will be further understood from the following description of example embodiments with reference to the drawings in which.

DETAILED DESCRIPTION OF PREFERRED EMBODIMENTS

Figure 1:
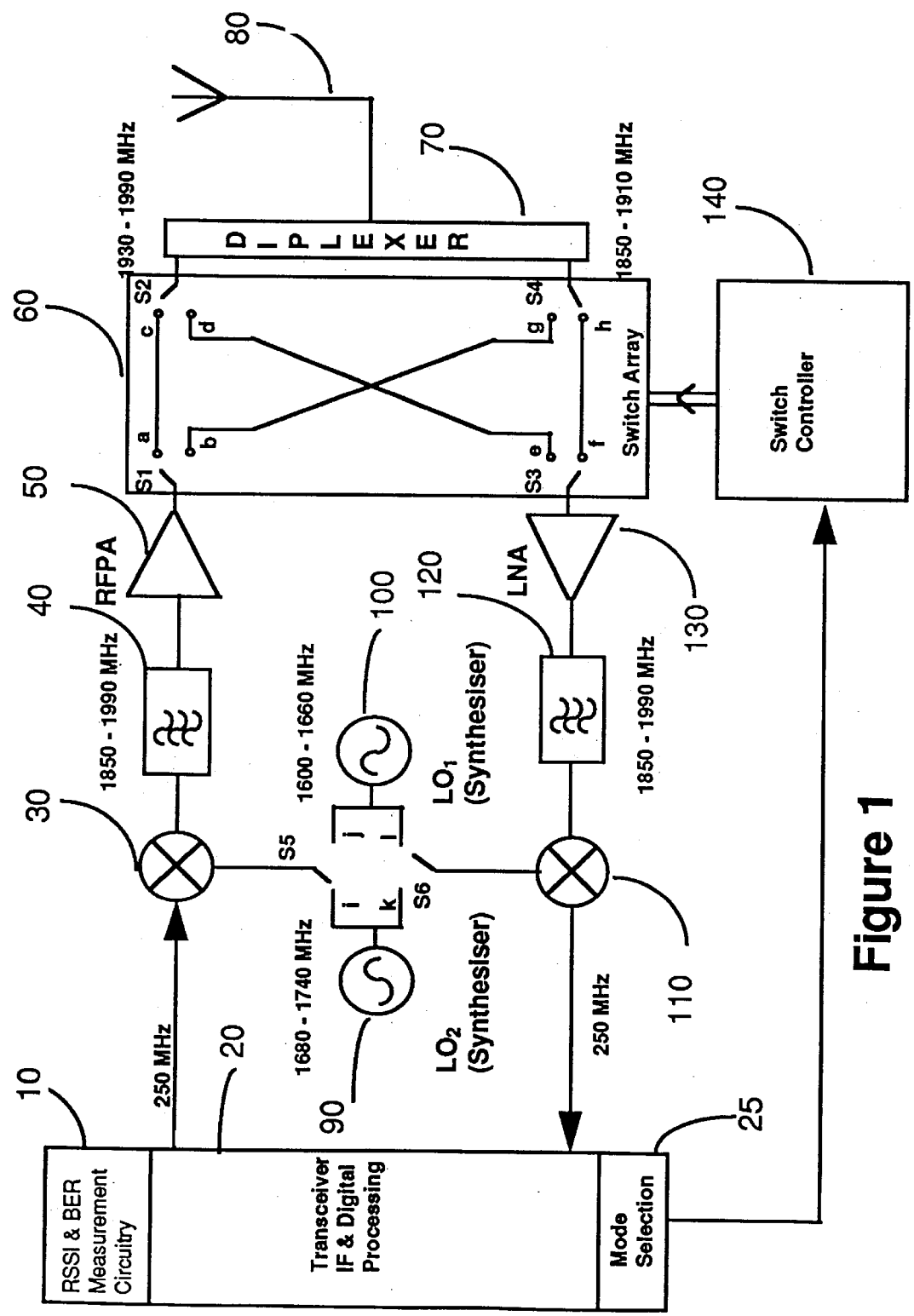
FIG. 1 is a schematic diagram illustrating the architecture of a dual mode transceiver according to one embodiment of the invention.

FIG. 1 illustrates the architecture for a transceiver according to one embodiment of the invention. In this figure, switches will be labeled as S1, S2, . . . S6, and the various states of these switches will be labeled with lower case letters. For example, switch S1 can be in either state a or b. The architecture shown in FIG. 1 will be discussed with respect to its implementation in a base station operating in the frequency ranges allocated to PCS in North America with an Intermediate Frequency (IF) of 250 MHz. It should be understood that such an architecture can be adopted to be used with other frequency ranges and it can also be implemented in a dual mode wireless terminal.

In a base station incorporating the architecture shown in FIG. 1, conventional Received Signal Strength Indication (RSSI) and Bit Error Ratio (BER) measuring circuitry 10 and transceiver Intermediate Frequency (IF) and digital processing circuitry 20 is used. Such a base station includes an up conversion path, a pair of local oscillators, a switch array 60, a diplexer 70 having an upper band filter having an effective range between 1930 and 1990 MHz and a lower band filter having an effective range between 1850 and 1910 MHz for allowing antenna arrangement 80 to be used for both transmission (Tx) and reception (Rx), and a down conversion path. The up conversion path includes a first mixer 30, a first filter 40, with an effective range between 1850 and 1990 MHz, a Radio Frequency Power Amplifier (RFPA) 50, in conjunction with one of the two variable local oscillators 90 and 100. The variable local oscillators can comprise synthesizers, or switched crystal oscillators with multiplier chains, voltage controlled oscillators or mechanically tuned oscillators. The choice of oscillator can vary depending on the particular application and is not specific to this invention. A first local oscillator 90 has an operating range between 1680 and 1740 MHz, whereas the second local oscillator 100 has an operating range between 1600 and 1660 MHz. Switch S5 determines which local oscillator is used for up conversion, wherein local oscillator 90 is used if switch S5 is in position i and the second local oscillator 100 is used if the switch S5 is in position j. Preferably the two local oscillators 90 and 100 are well isolated in order to avoid unwanted out of band reception or spurii.

The down conversion path includes the following components connected to the switch array 60 for use in down conversion: a low noise amplifier (LNA) 130, a second filter 120, with an operating range between 1850 and 1990 MHz, a second mixer 110, and a switch S6 for selecting between local oscillator 90, if switch S6 is in state k, and local oscillator 100, if switch S6 is in state 1.

The base station also includes a mode selection switch 25 to switch the transceiver's mode between TIDD and FDD, and a switch controller 140 for controlling switch array 60 and switches S5 and S6. Conveniently, switch 25 can be a manual switch, the state of which is selected when the base station is installed or serviced.

Switch array 60 comprises a network of four PIN diode switches. Switch S1 connects the output from the RFPA 50 to either switch S2, for connection to the upper band filter of diplexer 70 if S1 is in state a, or to switch S4 for connection to the lower band filter of diplexer 70 if switch S1 is in state b. Switch S2 connects the upper band filter of diplexer 70 to either S1, for connecting to the output of the RFPA 50 if switch S2 is in state c, or to S3 for connection to the input of the low noise amplifier 130 if switch S2 is in state d. Switch S3 connects the input of the LNA 130 to either switch S2, for connection to the upper band filter of diplexer 70 if switch S3 is in state e, or to the switch S4, for connection to the lower band filter of diplexer 70 if switch S3 is in state f. Switch S4 connects the lower band filter of diplexer 70 to switch S1 if switch S4 is in state g or to switch S3 if switch S4 is in state h.

Thus switch array 60 is capable of:

connecting an up converted signal to be transmitted to either the upper band filter or the lower band filter;

connecting the upper band filter of diplexer 70 to either the output of the RFPA 50 or the input of the low noise amplifier 130;

connecting the lower band filter of diplexer 70 to either the output of the RFPA 50 or the input to the LNA 130; and connecting the input to LNA 130 to either the upper band filter or the lower band filter of diplexer 70.

Thus, switch controller 140, by controlling the state of switches S1 through S6, allows common components, including the two local oscillators 90 and 100, up conversion components, down conversion components, diplexer 70 and antenna 80, to be used in either FDD or TDD mode. Note that for clarity, a control path from controller 140 to switches S5 and S6 is not shown.

The switch controller sets the states of the various switches depending on the mode of operating for the transceiver, as set out in Table 1.

TABLE 1

| SWITCH TABLE TDD Mode | | |
| --- | --- | --- |
| Switch | TDD Upper Band | TDD Lower Band |
| S1 | a | b |
| S2 | Tx/Rx | N/A |
| S3 | e | f |
| S4 | N/A | Tx/Rx |
| S5 | i | j |
| S6 | k | l |

| SWITCH TABLE FDD Mode | | |
| --- | --- | --- |
| Switch | FDD Upper Band Tx | FDD Lower Band Tx |
| S1 | a | b |
| S2 | c | d |
| S3 | f | e |
| S4 | h | g |
| S5 | i | j |
| S6 | l | k |

In operation, the transceiver IF and Digital Processing circuitry 20 generates an IF signal which is up converted to the output frequency by mixer 30 whose local oscillator is selected using switch S5. The selection of the local oscillator 90 or 100 determines whether transmission is in the upper or lower frequency band. The actual frequency that the selected local oscillator is set to within the stated range depends on the actual channel allocated for the signal, as set by transceiver IF and digital processing unit 20. The signal is then filtered by filter 40 to remove the image signal prior to amplification within the RFPA 50. The circuitry for transmission power control is not shown here as the means for power control need be no different to the well understood methods of power control in single mode systems. The output of the RFPA 50 is then connected to the diplexer's upper band filter or lower band filter using the switch array 60. The settings of the switches are determined by the switch controller 140 according to mode and are shown in Table 1. From the diplexer 70 the signal is connected to the antenna 80.

The receive signal from the antenna 80 is connected to the diplexer 70 and then to the switch array 60 where either the upper band filter or lower band filter is connected to the LNA 130 according to the selected mode, as set out in Table 1. The signal is now amplified, filtered by Filter 120, and then down converted to the desired IF frequency using mixer 110 and the local Oscillator 90 or 100, as selected by switch S6. The signal is now processed as in any other single mode system.

For example, for a base station operating in FDD mode using the upper band for transmission, the switch settings are set as shown in FIG. 1 and as listed under the FDD Upper Band Tx column under the SWITCH TABLE FDD mode heading of Table 1. Once these switch settings are set for FDD the switch controller does not need to change the settings of any switch, as long as the base station continues to operate in this mode.

As another example, let us assume that the mode selection switch 25 has been set for TDD mode in the upper frequency band. Therefore, the switch settings are as set out in the TDD upper band column of Table 1 under the SWITCH TABLE TDD mode heading. In this case, the IF signal generated by the transceiver IF and Digital Processing circuitry 20 is up converted using mixer 30 with the local oscillator signal from the first oscillator 90, as switch S5 is set to state i. The mixed signal is then filtered and amplified. The amplified signal is then connected to the upper band filter of the diplexer 70, as S1 is set to state a and switch S2, which alternates between states c and d, depending on whether the transceiver is transmitting or receiving, is set to state c during transmission for establishing the link from the amplifier 50 to the upper filter of the diplexer 70. Once the transmission time slot has been completed, the switch controller 140 changes the state of switch S2 to d for reception, using the same timing used in switching from Tx to Rx in a single mode TDD system.

Once switched for reception, the signal received by antenna 80 in the upper band will be fed through the upper band filter of diplexer 70 connected through switch S2 to switch S3, which being in state e, connects to the low noise amplifier 130 for amplification and then filtering. The filtered signal is then mixed in mixer 110 with the local oscillator signal from local oscillator 90, as switch S6 is in state k, in order to down convert the received signal from the upper band to the desired IF frequency. The signal is now processed as in any other single mode system.

It should be noted that for a TDD system the handset and the base station both transmit and receive on the same frequency, which can be in either the upper band or lower band. For an FDD system the mobile normally transmits on the lower frequency while the base station transmits on the upper frequency. The mobile normally receives on the upper frequency and the base station normally receives on the lower frequency. It should be noted that these standard FDD frequencies can be reversed should this be required. The networks shown can support other combinations of TDD and FDD frequencies by utilizing appropriate filters, oscillators and diplexer.

The above description has described the implementation of a transceiver according to the architecture of FIG. 1 in a base station. This architecture can also be implemented in a wireless terminal. In this case, mode is selection switch 25 will be set by the mode selection data sent by the base station.

Figure 2:
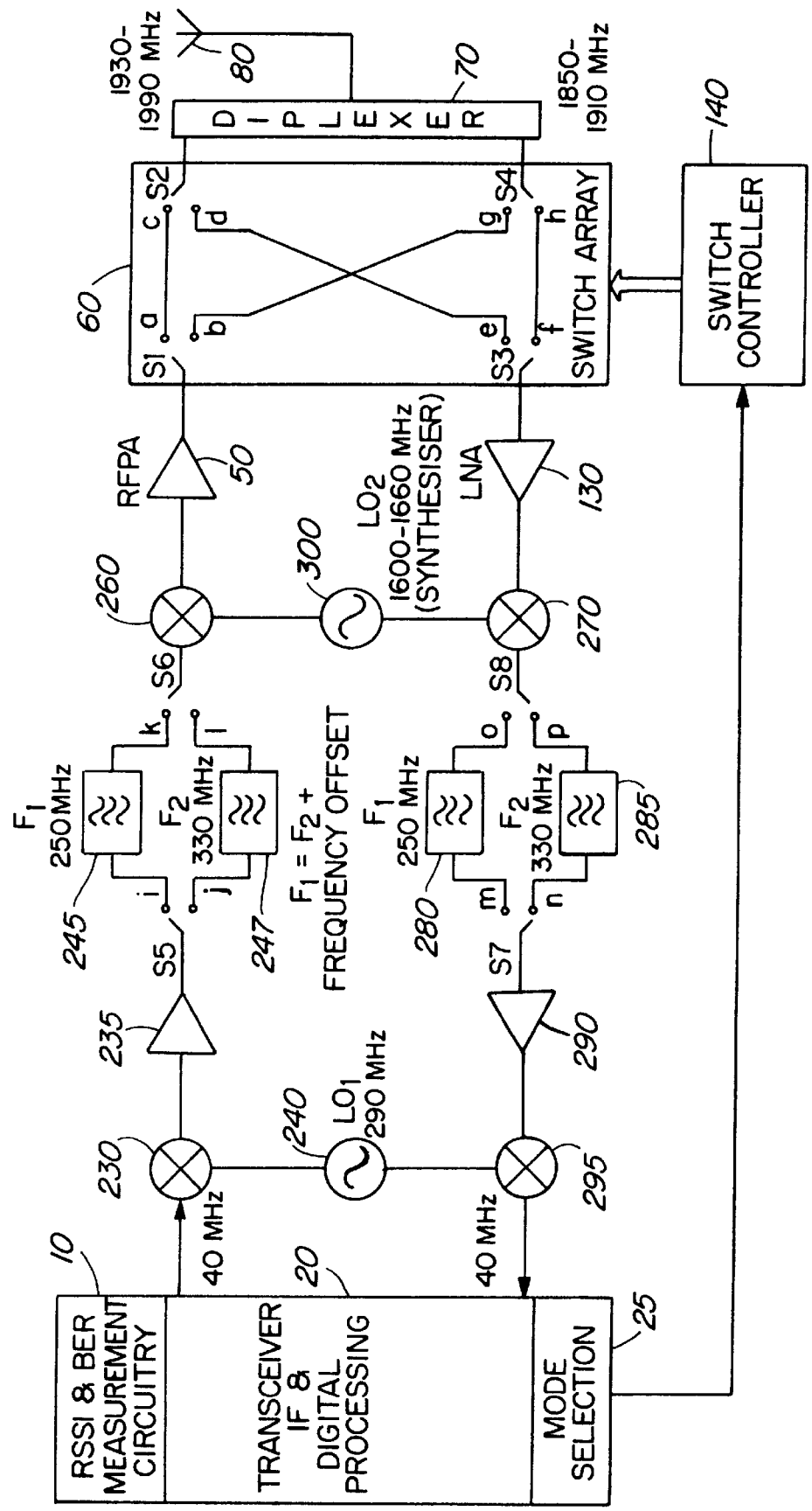
FIG. 2 is a schematic diagram illustrating an alternative architecture according to another embodiment of the invention..

FIG. 2 illustrates the architecture for a transceiver according to a second embodiment of the invention which is particularly suited for systems where there is a fixed frequency offset between the upper frequency range and the lower frequency range. In this figure, the architecture is similar to that of FIG. 1, except the up conversion path and down conversion path have been changed to make use of the fixed frequency offset. This allows for the replacement of one of the variable local oscillators of the embodiment of FIG. 1 with a fixed tuned local oscillator. Similar elements will be labeled the same as in FIG. 1, and will not be discussed in detail with respect to this embodiment, with the exception that the labels S5 and S6 will be revised for convenience.

A base station incorporating the architecture of FIG. 2 includes two local oscillators which are shared between the up conversion path and the down conversion path. The first local oscillator 240 produces a fixed frequency and the second local oscillator 300 is a tunable synthezised type oscillator. In this embodiment the IF frequency ($f_{if}$) is set to one half of the frequency offset (e.g., 40 MHz for an 80 MHz offset). In this embodiment, the first local oscillator 240 is fixed tuned, at frequency FLO, $f_{lo1}$, for example, at 290 MHz, whereas the second local oscillator 300 is variable and has an operating range between 1600 and 1660 MHz in this example.

In this embodiment the up conversion path comprises a first mixer 230, which is preferably an image reject mixer, a buffer amplifier 235, a filter pair 245 and 247, selectable with switches S5 and S6, a second mixer 260, and Radio Frequency Power Amplifier (RFPA) 50, in conjunction with the two oscillators. Switches S5 and S6 determine which filter is used for up conversion. Filter 245 is used if switch S5 is in position i and switch S6 is in position k giving a final output frequency in the lower band 1850–1910 MHz. Filter 247 is used if switch S5 is in position j and switch S6 in position 1 giving a final output frequency in the upper band 1930–1990 MHz. The frequency range of filters 245 and 247 are separated by the transmit/receive frequency offset and are chosen based on the IF frequency as follows: The frequency of filter 245, which is used for the lower band is chosen to be the frequency of local oscillator 240 ($f_{lo1}$) minus the IF frequency ($f_{if}$). Thus, the frequency of filter 245 in this example is 290 MHz–40 MHz=250 MHz. The frequency of filter 247, which is used for the upper band, is chosen to be the frequency of local oscillator 240 plus the IF frequency. Thus, the frequency of filter 247 in this example is 290 MHz+40 MHz=330 MHz.

The base station transceiver also has a down conversion path which includes the following components connected to the switch array 60 for use in down conversion: a low noise amplifier (LNA) 130, a third mixer 270, a filter pair 280 and 285 with frequencies of 250 MHz and 330 MHz, selectable with switches S7 and S8, a buffer amplifier, and a fourth mixer 295, which is preferably an image reject mixer.

Switch array 60 has the same configuration as in FIG. 1. However, in FIG. 2 switch controller 140 controls the state of switches S1 through S8, depending on the mode of operating for the transceiver, as set out in Table 2. It should be noted that in this embodiment, switch controller 140 also sends control signals (not shown) to switches S5 through S8 as well as image reject mixers 230 and 295.

TABLE 2

Switch Table

SWITCH TABLE TDD Mode

| Switch | TDD Upper Band Tx | TDD Lower Band Tx |
|---|---|---|
| S1 | a | b |
| S2 | Tx/Rx | N/A |
| S3 | e | f |
| S4 | N/A | Tx/Rx |
| S5 | j | i |
| S6 | l | k |
| S7 | n | m |
| S8 | p | o |
| Mixer 230 | $f_{lo1} + f_{if}$ | $f_{lo1} - f_{if}$ |
| Mixer 295 | $f_{lo1} + f_{if}$ | $f_{lo1} - f_{if}$ |

SWITCH TABLE FDD Mode

| Switch | FDD Upper Band Tx | FDD Lower Band Tx |
|---|---|---|
| S1 | a | b |
| S2 | c | d |
| S3 | f | e |
| S4 | h | g |
| S5 | j | i |
| S6 | l | k |
| S7 | m | n |
| S8 | o | p |
| Mixer 230 | $f_{lo1} + f_{if}$ | $f_{lo1} - f_{if}$ |
| Mixer 295 | $f_{lo1} - f_{if}$ | $f_{lo1} + f_{if}$ |

In operation, the transceiver IF and Digital Processing circuitry 20 generates an IF signal which undergoes a preliminary up conversion to one of two secondary IF frequencies by mixer 230. The selection of the filter 245 or 247 is determined by switches S5 and S6 which are set by switch controller 140 depending on whether transmission is in the lower or upper frequency band. For the upper band, mixer 230 will add the IF frequency $f_{if}$ to the oscillator frequency $f_{lo1}$ and for the lower band, mixer 230 will subtract the IF frequency $f_{if}$ from $f_{lo1}$, as shown in Table 2. The signal is then further upconverted to the allocated channel by mixer 260, using oscillator signal from synthesizer 300, prior to amplification within the RFPA 50. Once again, the circuitry for transmission power control is not shown here as the means for power control need be no different to the well understood methods of power control in single mode systems. The output of the RFPA 50 is then connected to the diplexer's upper band filter or lower band filter using the switch array 60. The settings of the switches are determined by the switch controller 140 according to mode and are shown in Table 2. From the diplexer 70 the signal is connected to the antenna 80.

The receive signal from the antenna 80 is connected to the diplexer 70 and then to the switch array 60 where either the upper band filter or lower band filter is connected to the LNA 130 according to the selected mode, as set out in Table 2. The signal is now amplified by LNA 130 and then undergoes a preliminary down conversion to a secondary IF frequency using mixer 270 and the local Oscillator 300. The IF output frequency of this mixer is then passed either through filter 280 for lower frequency band reception or through filter 285 for upper frequency band reception. The signal is then amplified by IF amplifier 290. The output of amplifier 290 is then down converted by mixer 295 to the final IF frequency of half the offset frequency. The signal is now processed as in any other single mode system.

For example, for a base station operating in FDD mode using the upper band for transmission, the switch settings are set as shown in FIG. 2 and as listed under the FDD Upper Band Tx column under the SWITCH TABLE FDD mode heading of Table 2. Once these switch settings are set for FDD the switch controller does not need to change the settings of any switch, as long as the base station continues to operate in this mode.

As another example, let us assume that the mode selection switch 25 has been set for TDD mode in the upper frequency band. Therefore, the switch settings are as set out in the TDD upper band column of Table 2 under the SWITCH TABLE TDD mode heading. In this case, the IF signal generated by the transceiver IF and Digital Processing circuitry 20 is up converted using mixer 230 with the local oscillator signal from the first oscillator 240. Switch S5 is set to state j and switch S6 to 1 so that filter 247 is used selecting upper band operation. The signal is then further upconverted to its transmission frequency using mixer 260 and local oscillator 300. The actual frequency that local oscillator 300 is set to within the stated range of 1600 to 1660 MHz depends on the actual channel allocated for the signal. The up converted signal is then amplified by the RFPA 50. The amplified signal is then connected to the upper band filter of the diplexer 70, as S1 is set to state a and switch S2, which alternates between states c and d, depending on whether the transceiver is transmitting or receiving, is set to state c during transmission for establishing the link from the amplifier 50 to the upper filter of the diplexer 70. Once the time slot has been completed and it is time to receive, the switch controller 140 changes the state of switch S2 to d for reception. Once switched for reception, the signal received by antenna 80 in the upper band will be fed through the upper band filter of diplexer 70 connected through switch S2 to switch S3, which being in state e, connects to the low noise amplifier 130 for amplification and then filtering. The filtered signal is then mixed in mixer 270 with the local oscillator signal from local oscillator 300, as switch S8 is in state p and switch S7 is in state n filter 285 is selected for upper band reception. This preliminary down converted signal is then amplified by amplifier 290 and finally down converted to its final IF frequency by mixer 295 and local oscillator 240. Further processing is identical to a single mode system.

The above description has described the implementation of a transceiver according to the architecture of FIG. 2 in a base station. This architecture can also be implemented in a wireless terminal. In this case, mode selection switch 25 will be set by the mode selection data sent by the base station.

For either of the above embodiments, the following should be noted. Rather than using a manual mode selection switch 25 for a base station as described above, more functionality can be obtained if the mode is selected via the OAM control (Operations and Maintenance). In this case a suitable control signal is used to select the operating mode in the same manner as any other controllable function of a base station. Whether local or remote control is used it is necessary to provide a means of informing the mobile which mode of operation is currently being used by the base station, both for access and traffic purposes. Typically, a means is provided at the Base Transmitting Station to broadcast a control code for providing any mobiles within range with data about the BTS. For example, a Broadcast Control Channel is used in GSM. For a dual mode system an additional message is added to the transmitted data that enables the mobile to determine the mode of operation of the Base Station.

Furthermore, switch array 60 was described as comprising PIN diode switches. It should be noted that alternative switches, for example, FET or solid state switches, can be used depending on the insertion loss/isolation/switching speed and power levels required in the system.

As alternative to a diplexer, an equivalent arrangement includes an upper band filter, a lower band filter and a circulator attached to the antenna.

This description does not describe features which are normally found in single mode transceivers, for example, for diversity, power control, agc, etc. or the use of multiple synthesizers as may be required if techniques such as frequency hopping are incorporated, as such features can be readily adapted for the above embodiment using known techniques.

Numerous modifications, variations and adaptations may be made to the particular embodiments of the invention described above without departing from the scope of the invention, which is defined in the claims.

We claim:

1. A dual mode transceiver operable in either a Frequency Division Duplexing (FDD) or Time Division Duplexing (TDD) mode comprising:
    an up conversion path for converting an intermediate frequency (IF) signal to a radio frequency (RF) signal in either an upper frequency range or a lower frequency range;
    a down conversion path for converting a received RF signal in either an upper frequency range or a lower frequency range to an IF signal;
    a diplexer, having an upper range filter and a lower range filters for connecting to an antenna;
    a switch array which in FDD mode, connects said up conversion path to one of said upper range filter and said lower range filter and connects said down conversion path to the other said filter, and, in TDD mode, alternatively connects said up and down conversion paths to a selected one of said upper range filter and said lower range filter;
    a switch controller for selecting which connections are made by said switch array depending on mode of operation and on whether said transceiver is transmitting or receiving; and
    a mode selection switch, for selecting whether said transceiver is operating in FDD or TDD mode.

2. A transceiver as claimed in claim 1, further comprising:
    a first variable local oscillator signal source having a first frequency range; and
    a second variable local oscillator signal source having a second frequency range;
    and wherein said up conversion path comprises a first mixer having an IF input and an oscillator input, said oscillator input selected by a first switch for selecting between said first variable local oscillator signal source and said second variable local oscillator signal source;
    and wherein said down conversion path comprises a second mixer having an RF input and an oscillator input, said oscillator input selected by a second switch for selecting between said first variable local oscillator signal source and said second variable local oscillator signal source.

3. A transceiver as claimed in claim 2 wherein the states of said first switch and said second switch are determined by said switch controller.

4. A base station containing the transceiver as claimed in claim 3.

5. A wireless terminal containing the transceiver as claimed in claim 3.

6. A transceiver as claimed in claim 1, for use in wireless communication networks in which there is a frequency offset between said upper frequency range and said lower frequency range, wherein said up conversion path comprises:
    a preliminary up conversion arrangement for converting an intermediate frequency signal to a secondary signal in one of two secondary frequency ranges, said two secondary ranges separated in frequency by said frequency offset, and
    a final up conversion arrangement for converting said secondary signal to said RF signal;
    and wherein said down conversion path comprises:
    a preliminary down conversion arrangement for converting said RF signal, in either said upper frequency range or said lower frequency range to a secondary signal in one of two secondary frequency ranges, said two secondary ranges separated in frequency by said frequency offset; and
    a final down conversion arrangement for converting said secondary signal to said IF signal.

7. A transceiver as claimed in claim 6, further comprising:
    a first local oscillator signal source; and
    a second local oscillator signal source,
    wherein one of said local oscillator signal sources is variable.

8. A transceiver as claimed in claim 7 wherein said first local oscillator signal source is used in conjunction with said preliminary up conversion arrangement and said final down conversion arrangement, and wherein said second local oscillator signal source is used in conjunction with said final up conversion arrangement and said preliminary down conversion arrangement.

9. A transceiver as claimed in claim 8 wherein each of said preliminary conversion arrangements additionally comprise:
    a first filter,
    a second filter, and
    a switching mechanism for selecting between said first filter and said second filter.

10. A transceiver as claimed in claim 6, further comprising:
    a fixed local oscillator signal source, and
    a variable local oscillator signal source;
    and wherein
    said preliminary up conversion arrangement comprises:
        a first mixer for mixing said IF signal with a signal produced by said fixed local oscillator signal source,
        a first filter having a first frequency,
        a second filter having a second frequency, said first and second frequency separated in frequency by said frequency offset,
        and a switching arrangement for selecting which of said first and second filters to use in connecting said preliminary up conversion arrangement with said final up conversion arrangement;
    said final up conversion arrangement comprises a second mixer for mixing said secondary signal with a signal produced by said variable local oscillator signal source;

said preliminary down conversion arrangement comprises a third mixer for mixing said RF signal with a signal produced by said variable local oscillator signal source, a first filter having a first frequency, a second filter having a second frequency, said first and second frequencies separated in frequency by said frequency offset, a switching arrangement for selecting which of said first and second filters to use in connecting said preliminary down conversion arrangement with said final down conversion arrangement; and said final down conversion arrangement comprises a fourth mixer for mixing said secondary signal with a signal produced by said fixed local oscillator signal source.

11. A transceiver as claimed in claim 10 wherein said first and fourth mixers are image reject mixers.

12. A transceiver as claimed in claim 10 wherein said switching arrangement is controlled by said switch controller.

13. A base station containing the transceiver as claimed in claim 6.

14. A wireless terminal containing the transceiver as claimed in claim 6.

15. A base station containing the transceiver as claimed in claim 10.

16. A wireless terminal containing the transceiver as claimed in claim 10.

17. A transceiver as claimed in claim 1, further comprising:

a variable local oscillator signal source; and and wherein said up conversion path comprises:

a first mixer having a first input and an input connected to said variable local oscillator signal source; and first means for producing a signal for said first input which is at a first frequency for upconverting to a frequency in said upper frequency range and which is at a second frequency for upconverting to a frequency in said lower frequency range;

and wherein said down conversion path comprises:

a second mixer having a RF frequency input and an input connected to said variable local oscillator signal source; and second means for further down converting the output from said second mixer to a desired IF frequency regardless of whether said RF frequency input is in said upper frequency range or said lower frequency range.

18. A base station as claimed in claim 4, further comprising a means for transmitting mode selection data.

19. A wireless terminal as claimed in claim 5 further, comprising means for selecting mode based on the mode selection data received from a base station.

20. A base station as claimed in claim 13, further comprising a means for transmitting mode selection data.

21. A wireless terminal as claimed in claim 14, further comprising means for selecting mode based on the mode selection data received from a base station.

22. A dual mode transceiver comprising:

transmit means for up converting an intermediate frequency (IF) signal to a radio frequency (RF) signal in either an upper frequency range or a lower frequency range;

receive means for down converting a received RF signal in either an upper frequency range or a lower frequency range to an IF signal;

means for connecting an upper band filter and a lower band filter to an antenna;

switch means for:

connecting an up converted signal to be transmitted to either the upper band filter or the lower band filter, connecting the upper band filter to either the output of the transmit means or the input of the receive means, connecting the lower band filter to either the output of the transmit means or the input of the receive means, and connecting the input of the receive means to either the upper band filter or the lower band filter;

and controller means for selecting which connections are made by said switch means depending on in which mode the transceiver is operating and on whether said transceiver is transmitting or receiving.

* * * * *